United States Patent
Patel et al.

(10) Patent No.: US 11,656,930 B2
(45) Date of Patent: May 23, 2023

(54) MINIMIZING IMPACT OF FIRST FAILURE DATA CAPTURE ON COMPUTING SYSTEM USING RECOVERY PROCESS BOOST

(71) Applicant: International Business Machines Corporation, Armonk, NY (US)

(72) Inventors: Purvi Sharadchandra Patel, Rock Hill, SC (US); Scott B. Compton, Hyde Park, NY (US); Peter Grimm Sutton, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/350,211

(22) Filed: Jun. 17, 2021

(65) Prior Publication Data

US 2022/0405163 A1    Dec. 22, 2022

(51) Int. Cl.
 *G06F 11/00* (2006.01)
 *G06F 11/07* (2006.01)
 *G06F 9/50* (2006.01)

(52) U.S. Cl.
 CPC ........ *G06F 11/0778* (2013.01); *G06F 9/5005* (2013.01); *G06F 11/0721* (2013.01); *G06F 11/0751* (2013.01)

(58) Field of Classification Search
 CPC ............. G06F 11/0778; G06F 11/0721; G06F 11/0751; G06F 11/0706; G06F 11/0703; G06F 11/0793; G06F 11/1402
 See application file for complete search history.

(56) References Cited

U.S. PATENT DOCUMENTS 10,275,167 B2   4/2019   Harman et al.
10,657,027 B2   5/2020   Mulder et al.
(Continued)

FOREIGN PATENT DOCUMENTS

FR    2802571 A1 *  6/2001   ............. E21B 47/12

OTHER PUBLICATIONS

Anonymous, "An OS-Agnostic First Failure Data Capture and Analysis Architecture Using Virtual Address Relocation with Core Dump Technology for Enterprise Applications," IP.com Prior Art Database Technical Disclosure, IPCOM000230895D, Sep. 17, 2013, 3 pages.

(Continued)

*Primary Examiner* — Katherine Lin
(74) *Attorney, Agent, or Firm* — Cantor Colburn LLP; Teddi Maranzano

(57) ABSTRACT

A computer-implemented method for capturing system memory dumps includes receiving, by a diagnostic data component, an instruction to capture a system memory dump associated with a computer process being executed by a computing system comprising one or more processing units, the system memory dump comprising data from a plurality of memory locations associated with the computer process. In response to determining that the system memory dump satisfies a predetermined criterion, the diagnostic data component sends a request for a computing resource boost from the computing system. Further, in response to the request for the computing resource boost being granted, the diagnostic data component uses additional computing resources from the one or more processing units to store the data from the plurality of memory locations in the system memory dump and executing the backlogged operations that were halted due to the system memory dump capture.

18 Claims, 5 Drawing Sheets

(56) References Cited

U.S. PATENT DOCUMENTS

| | | |
|---|---|---|
| 10,725,674 B2 | 7/2020 | Harman et al. |
| 10,740,166 B2 | 8/2020 | Macfarlane |
| 2021/0019219 A1* | 1/2021 | Patel .................. G06F 11/0781 |

OTHER PUBLICATIONS

Anonymous, "First Failure Data Capture (FFDC) Technique," IP.com Prior Art Database Technical Disclosure, IPCOM000222155D, Sep. 20, 2012, 5 pages.

Anonymous, "Reducing Impact of Firmware Failures to Prevent System Down Time," IP.com Prior Art Database Technical Disclosure, IPCOM000184052D, Jun. 9, 2009, 3 pages.

Brevett et al., "A method for the recovery of data after a company system failure: the development of Constant Random Access Memory (CRAM) Recovery System," Iowa State University Capstones, Theses and Dissertations, 1992, 241 pages.

Graefe et al., "Definition, Detection, and Recovery of Single-Page Failures, a Fourth Class of Database Failures," Proceedings of the VLDB Endowment, vol. 5, No. 7, Aug. 2012, pp. 646-655.

Lomet et al., "Efficient Transparent Application Recovery in Client-Server Information Systems," ACM SIGMOD Record, vol. 27, No. 2, Jun. 1998, pp. 460-471.

* cited by examiner

MINIMIZING IMPACT OF FIRST FAILURE DATA CAPTURE ON COMPUTING SYSTEM USING RECOVERY PROCESS BOOST

BACKGROUND

The present invention relates in general to computing technology and relates more particularly to computing systems in which a failure data capture can adversely impact system performance.

Computing systems require "memory" (volatile, and non-volatile) to function. This computer memory is referenced by address and the full range of memory available to the computing system is known as the address space. When an error/failure with a computing system is being investigated, the content of the address space is important as it shows the state of the processes within the computing system.

To access the content of the address space for diagnostic purposes a system dump is generated or carried out. However, a system dump is a time-consuming and resource-intensive process that causes a significant delay to other processes within the computing system.

SUMMARY

A computer-implemented method for capturing system memory dumps includes receiving, by a diagnostic data component, an instruction to capture a system memory dump associated with a computer process being executed by a computing system comprising one or more processing units, the system memory dump comprising data from a plurality of memory locations associated with the computer process. In response to determining that the system memory dump satisfies a predetermined criterion, the diagnostic data component sends a request for a computing resource boost from the computing system. Further, in response to the request for the computing resource boost being granted, the diagnostic data component uses additional computing resources from the one or more processing units to store the data from the plurality of memory locations in the system memory dump.

According to one or more embodiments of the present invention, a computing system includes a memory, one or more processing units, and a diagnostic data component that is coupled with the memory and the one or more processing units. The diagnostic data component performs a method for capturing a system memory dump. The method for capturing system memory dumps includes receiving, by a diagnostic data component, an instruction to capture a system memory dump associated with a computer process being executed by a computing system comprising one or more processing units, the system memory dump comprising data from a plurality of memory locations associated with the computer process. In response to determining that the system memory dump satisfies a predetermined criterion, the diagnostic data component sends a request for a computing resource boost from the computing system. Further, in response to the request for the computing resource boost being granted, the diagnostic data component uses additional computing resources from the one or more processing units to store the data from the plurality of memory locations in the system memory dump.

According to one or more embodiments of the present invention, a computer program product includes a memory device having computer-executable instructions stored thereon, the computer-executable instructions when executed by one or more processing units cause the one or more processing units to perform a method for capturing a system memory dump. The method for capturing system memory dumps includes receiving, by a diagnostic data component, an instruction to capture a system memory dump associated with a computer process being executed by a computing system comprising one or more processing units, the system memory dump comprising data from a plurality of memory locations associated with the computer process. In response to determining that the system memory dump satisfies a predetermined criterion, the diagnostic data component sends a request for a computing resource boost from the computing system. Further, in response to the request for the computing resource boost being granted, the diagnostic data component uses additional computing resources from the one or more processing units to store the data from the plurality of memory locations in the system memory dump.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
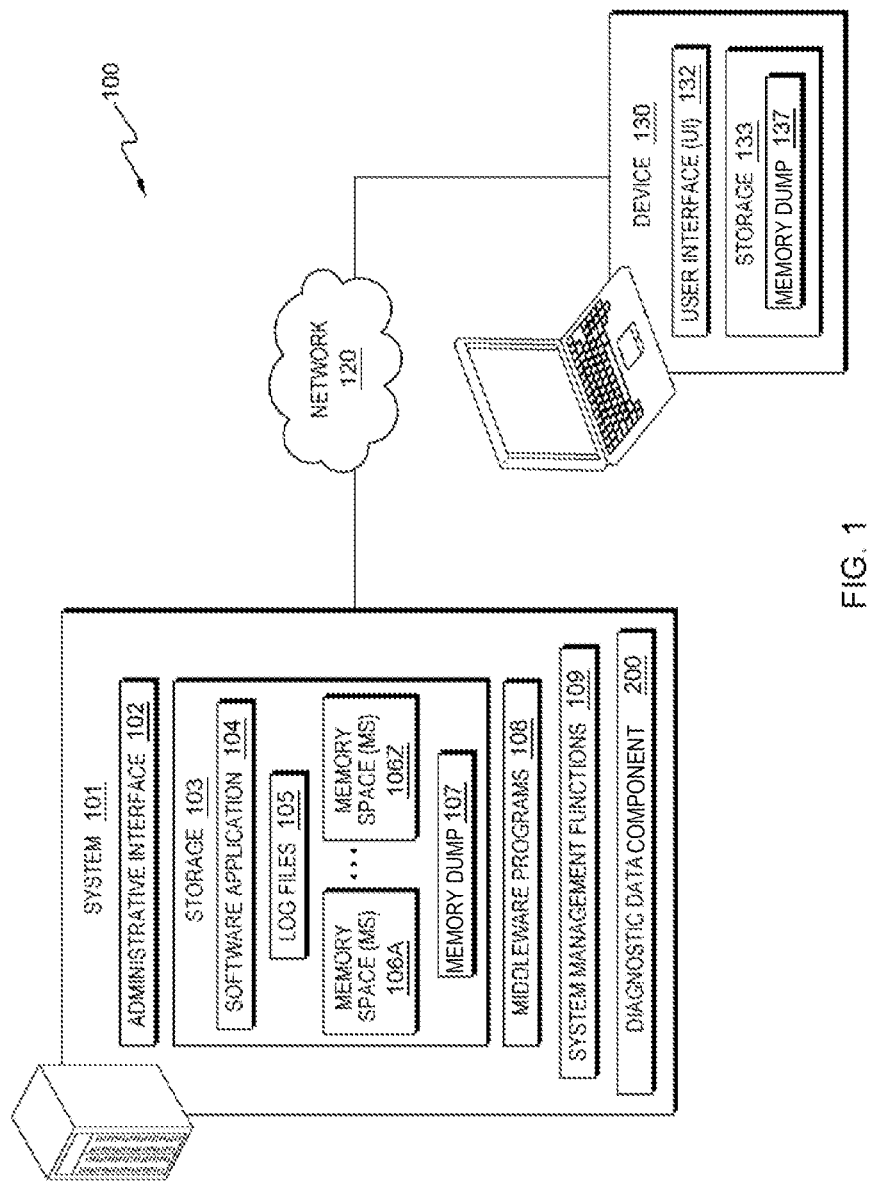
FIG. 1 depicts a computing environment according to one or more embodiments of the present invention.

The diagrams depicted herein are illustrative. There can be many variations to the diagram or the operations described therein without departing from the spirit of the invention. For instance, the actions can be performed in a differing order, or actions can be added, deleted, or modified. Also, the term "coupled" and variations thereof describe having a communications path between two elements and do not imply a direct connection between the elements with no intervening elements/connections between them. All of these variations are considered a part of the specification.

DETAILED DESCRIPTION

Exemplary embodiments of the present invention relate to, among other things, devices, systems, methods, computer-readable media, techniques, and methodologies for minimizing the impact of first failure data capture (FFDC) on a computing system using recovery boost. Further, aspects of the present invention relate generally to the field of debugging software applications, and more particularly to identifying and collecting data for analysis of non-fatal abnormalities that occur during the execution of a software application.

A software application may include a plurality of modules, environments, executable files, and dynamically linked libraries that execute within one or more memory spaces. A software application can drive several end-user programs to perform a group of coordinated functions tasks, and/or activities for the benefit of the users of a computing system. A software application may also access data from various sources and other computing systems (e.g., storage systems). During the development, testing, and deployment of a software application, users of a software application may encounter various problems and inconsistencies during the execution of a software application. Some problems are internal to the software application. Other problems experienced by the software application can be related to interactions with other software and/or system issues. Various memory dumps and system logs can be supplied to the developers of the software application to debug the software application.

Embodiments of the present invention recognize that an operating system (OS), system monitoring software, and system management software can capture data while a computing system is running and hosting the execution of a multitude (hundreds, thousands, and even millions) of software applications and/or processes. Various functions can trace and log the status of processes (e.g., services, software applications, communication applications, hardware operations, etc.) while the computing system is utilized by the hosted software applications. A fatal error (e.g., an abend, a fatal exception error, etc.) and some non-fatal errors can occur during the execution of a software application, resulting in a condition that is automatically detectable within the computing system. The computing system can include numerous automatic functions that can initiate dumps of data in response to a fatal error. For example, a system problem management function can generate a first failure data capture (FFDC) that includes a dump and other job/system related data. The dumped data is utilized to diagnose and debug problems in software applications and/or the operations of the computing system. Some dumps can be limited to the execution environment of a single software application. Other dumps can obtain system-wide data related to a fatal error.

Embodiments of the present invention recognize that some non-fatal errors and abnormalities that occur during the execution of a software application may not generate automatic dumps of data to aid in analyzing and debugging the non-fatal error. In addition, embodiments of the present invention recognize that a class of errors exists that is not detected by or recognized by the software of a computing system. Some such errors are attributable to factors outside of the code of the software application, such as middleware issues, operating system services, and interactions with one or more hardware elements (e.g., device drivers) within the computing system. Non-fatal errors, such as hangs, poor performance, stuck in a loop, data loss, data corruption, and/or a class of errors not detected or recognized by the software of a computing system; are herein referred to as issues that affect a software application. When an issue affecting a software application problem is undetected by the software of a computing system, the administrator of the computing system, or any other user, can respond by manually initiating a dump to collect diagnostic data.

A user/developer/owner of a software application may request dumps of data in response to events or issues, which occur during the execution of the software application. In some scenarios, a technician, an operator, a system programmer, or an administrator of the computing system, herein referred to as an administrator, initiates dump of data in response to a request from a developer of a software application. In other scenarios, an administrator of the computing system initiates dumps in response to a group of users of the computing system identifying issues related to the computing system. Alternatively, an administrator of the computing system initiates dumps based on observing the operational states of the computing system or based on messages generated by one or more monitoring programs of the computing system.

The computing system that hosts a software application may provide various services, middleware, and tasks (e.g., ancillary processes) that are accessed by the software application. As such, a virtualized computing system (e.g., a mainframe computer) may track the processes of a software application and the processes, such as operating system services, kernel tasks, daemons, and/or middleware utilized by the software application by unique identifiers. For example, a process identifier (PID) can be a number or job name utilized by an operating system kernel to uniquely identify a scheduled process and/or an active process. One or more PIDs are available within a memory space and may execute or be scheduled to execute within the memory space. As with PIDs, memory spaces within a virtualized computing system can be uniquely identified (e.g., referenced), such as by address space identifiers (ASIDs). In some embodiments of the present invention, the terms ASID and memory space can be used interchangeably.

Embodiments of the present invention can increase the ability to collect more relevant data related to issues affecting a software application invocation. For example, although existing techniques can facilitate a system memory dump to collect memory from several memory spaces, it can take substantial time to do this, and in some cases this duration causes premature termination of data collection. Embodiments of the present invention address such technical problems by improving the speed (i.e., reducing duration) of data collection. Embodiments of the present invention utilize various relationships among processes, services, middleware programs, and tasks to determine a larger number of memory spaces (e.g., ASID) of interest. The larger number of memory spaces are dumped in response to a request to obtain data to diagnose more thoroughly (e.g., analyze and debug) a software application. Embodiments of the present invention utilize relationships between processes, such as cross-memory relationships or process trees, to identify additional memory spaces to automatically include in a dump of data.

Other embodiments of the present invention utilize relationships among executing services of a computing system to identify the additional memory spaces to automatically include in a dump. For example, if users of different software applications report related problems, then an administrator of the computing system can formulate a dump request based on observations of the user. The administrator can begin with one group of processes and memory spaces and automatically expand the scope to identify additional memory spaces and/or find other processes executing within shared memory spaces.

Some embodiments of the present invention can constrain (e.g., dictate) the scope or size of a dump of memory spaces. In an example, the scope for identifying memory spaces may be constrained to three levels (e.g., parent processes, child processes, grandchild processes), 2-degrees removed, etc. In another example, if a cross-memory relationship is identified for an orphan process (e.g., a PID) by a memory cataloging function (not shown), then the orphan process and corresponding ASID may be excluded from the memory spaces to be dumped. In another example, if a system management function of a computing system determines that the size of the aggregate dump file is approaching a size that impacts the performance of the system for other users, then one or more in-progress dump services can be cancelled or the scope of memory space identification may be truncated. Additionally, as noted earlier, because collecting data from several memory spaces can be time consuming, capturing system memory dumps can cause processes to be non-dispatchable for that much period of time, causing work to back up. Resuming the backed-up (or backlogged) work, i.e., processes is a technical challenge addressed by one or more embodiments of the present invention.

Further embodiments of the present invention can identify memory spaces of interest for a dump based on identifying relationships other than cross-memory relationships. In one example, the provisioning information associated with a memory space may be analyzed to identify other processes and corresponding memory spaces that are unrelated to a software application but can affect the process utilized by the software application. In this example, processes not utilized by the software application, by virtue of their provisioning, may be over-utilizing computing resource and "starving" the processes utilized by the software application. In another example, other relationships and interactions between memory spaces may be associated with internal calls (e.g., software emulation as opposed to direct hardware processing), component interfaces, physical device drivers, virtual device drivers, storage tier assignments, ancillary services, etc. that are not directly utilized by a software application or a service within a computing system. In some instances, such relationships and interactions between memory spaces can introduce issues that affect a software application and degrade performance of the software application.

Further, embodiments of the present invention provide beneficial capabilities to the users and developers of a software application by identifying additional memory spaces utilizing cross-memory relationships and relationships between processes, tasks, and services utilized by a software application. In addition, identifying additional memory spaces utilizing cross-memory relationships and relationships between other processes, tasks, and services of a computing system is beneficial for administrators of the computing system.

As can be noted, the volume of data that may be captured in a system dump can be exceptionally large (hundreds of gigabytes (GBs)). Additionally, with increased 64-bit architecture in operating systems (e.g., Z/OS®), the volume of memory with data for a software application has increased the address space limits. Individual applications can create and access several GBs (5, 10, etc.) of memory occupied data alone, so aggregating multiple applications can result in the utilization of vast volumes of memory (multiple GBs). The greater the volume of the data, the more space is needed to save the system dumps captured in response to an error (fatal/non-fatal). Capturing the system dump also takes a longer time (hours, several minutes, etc.), move it (send it), and analyze it to determine the root cause of the error.

Such a long duration of a system dump capture is a technical challenge because to gather a static picture at the time of the error, i.e., capture system dump, the operating system, and particularly system diagnostic component halts the computing system as well as operations in "non-exempt" address spaces by setting the system and all tasks in dumping address space non-dispatchable while capturing the requested (global & local) data. Here, "non-exempt" address spaces represent address spaces that are exempt from being set non-dispatchable for data capture perspective. The "non-dispatchable" is a status setting that informs the components and/or processes in the computing system that the content, e.g., address space, which is marked as such, where all work within it is halted until reset dispatchable. "Dispatchable" is a status indicator representing work that can be operated upon. The data, typically, is reset to "dispatchable" after the system dump is captured and the tasks within the dumping address space are reset dispatchable after the local data for the address space has been captured.

As noted earlier, as software applications continue to exploit more and more virtual memory, more data may have to be captured in response to error(s), which will not only increase the size of the system dumps, but will also elongate the dump capture times, hence, keeping tasks non-dispatchable for longer periods of time. Accordingly, capturing a system dump adversely impacts the application availability, and the overall system availability.

Further, capturing the system dump for one error, can affect the FFDC for other errors that occur concurrently, for example, substantially at the same time as the first error, because only one system dump can be captured at a time.

Further, as the data gathering for capturing system dumps puts pressure on the computing system by consuming system resources, several system operations are halted, creating a backlog of work, impacting software applications executing on the computing system. Embodiments of the present invention reduce impact of collecting FFDC on the system by improving overall dump capture times and further aid clearing the backlog of work after the system dump capture is completed (post dump capture).

Embodiments of the present invention use system recovery boost capabilities, which is available with processor architectures, such as the IBM® Z15™, to provide additional computing capacity to work through a backlog of work that has accumulated while the computing system was halted for some reason. For example, a speed boost that can be provided by such capabilities can improve the recovery time of exploiting operating systems when running on a sub capacity processor. A "sub capacity" processor is a processor that is configured to operate at a fraction (e.g., 80%, 85%, etc.) of its maximum capacity.

Embodiments of the present invention described herein provide technical solutions to such technical challenges by facilitating an improvement to the system dump capture times.

FIG. 1 is a functional block diagram illustrating computing environment 100, in accordance with an embodiment of the present invention. In an embodiment, networked computing environment 100 includes: system 101 and device 130 interconnected over network 120. In some embodiments, computing environment 100 is representative of a virtualized computing environment, such as within a mainframe computer. In other embodiments, computing environment 100 is representative of a networked computing environment. In various embodiments, computing environment 100 is representative of a combination of architectures supporting a plurality of instances of system 101, such as within a data center. Many modifications to the depicted environment may be made by those skilled in the art without departing from the scope of the invention as recited by the claims.

System 101 and device 130 may be: laptop computers, tablet computers, netbook computers, personal computers (PC), desktop computers, personal digital assistants (PDA), smart phones, wearable devices (e.g., digital eyeglasses, smart glasses, smart watches, smart televisions, etc.), or any programmable computing systems known in the art. In certain embodiments of the present invention, system 101 and device 130 represent computing systems utilizing clustered computers and components (e.g., database server computers, application server computers, etc.) that act as a single pool of seamless resources when accessed through network 120, as is common in data centers and associated with cloud-computing applications.

In general, system 101 and device 130 are representative of any programmable electronic device or combination of programmable electronic devices capable of executing machine-readable program instructions and communicating with users of system 101 and device 130, via network 120. System 101 and device 130 may include components, as depicted, and described in further detail with respect to FIGS. herein, in accordance with embodiments of the present invention.

In various embodiments of the present invention, system 101 is representative of a virtualized computing system that can include a plurality of physical, virtualized, and/or para-virtualized computing entities; and can be configured to produce various execution environments. In one embodiment of the present invention, system 101 is representative of a single LPAR to host a software application. In another embodiment of the present invention, system 101 is representative of a plurality of LPARs to host various aspects of a software application. In some embodiments of the present invention, system 101 is representative of a large computing system (e.g., a computing node) or group of computing systems configured to support an enterprise software application or host software application for a plurality of customers.

System 101 includes: administrative interface 102, storage 103, middleware programs 108, system management functions 109, and diagnostic data component 200. In some embodiments of the present invention, system 101 accesses one or more computing programs and/or databases that are network accessible and are utilized by one or more embodiments of the present invention and/or the execution of software application 104. In an example, system 101 may have a license to access a virtual engineering program and/or one or more analytics programs as-a-service via a cloud-service provider.

Administrative interface 102 is representative of one or more control consoles associated with system 101 that include input and display capabilities. In one embodiment of the present invention, administrative interface 102 provides command line input and control of system 101. In another embodiment of the present invention, administrative interface 102 may be a graphical user interface (GUI) or a web user interface (WUI), and administrative interface 102 can display text, documents, forms, web browser windows, user options, application interfaces, and instructions for operation, and include the information, such as graphic, text, and sound that a program presents to an administrator of system 101. Administrative interface 102 may include a plurality of windows for viewing and/or inputting information to system 101. For example, administrative interface 102 may include a plurality of dashboards depicting the operations and key performance indicators of system 101 and sending messages to and receiving messages from users of system 101.

In addition, administrative interface 102 controls sequences/actions that an administrator of system 101 utilizes to input requests for data to diagnostic data component 200. In various embodiments of the present invention, administrative interface 102 displays one or more icons representing applications that a user can execute via network 120, such as diagnostic data component 200 and various programs (not shown) of system 101 and/or other computing systems accessible via network 120. In addition, administrative interface 102 can control sequences of actions that the user utilizes to respond and/or confirms actions associated with diagnostic data component 200 and/or system management functions 109.

In some embodiments of the present invention, an administrator of system 101 can interact with administrative interface 102 via a singular device, such as a touch screen (e.g., display), that performs both input to a GUI/WUI, and as an output device (e.g., a display) presenting a plurality of icons associated with apps and/or images depicting one or more executing software applications. In other embodiments of the present invention, one or more aspects of system management functions 109 can generate administrative interface 102 operating within system 101. Administrative interface 102 may accept input from one or more input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, administrative interface 102 may receive input in response to an administrator of system 101 utilizing natural language, such as written words or spoken words, that system 101 identifies as information and/or commands.

Storage 103 includes software application 104, log files 105, memory spaces (MS) 106A through 106Z, and memory dump 107. In one embodiment of the present invention, storage 103 includes volatile memory, such as random-access memory and non-volatile memory (e.g., storage-class memory, persistent storage, etc.), such as flash memory, solid-state drives, hard-disk drives, and magnetic tapes. In some embodiments of the present invention, the resources of storage 103 change in response to the execution environment of system 101. In one example, if system 101 is representative of an LPAR, then storage 103 is provisioned by a hypervisor (not shown) and may include virtualized storage entities. In another example, if system 101 is representative of a computing node, then storage 103 may be comprised of physical storage entities.

Storage 103 includes various programs and data. In one embodiment of the present invention, storage 103 may also include various programs and/or databases, such as but not limited to: a hypervisor, one or more operating systems (e.g., a host OS, various guest OSs), a file management program, a database management system, communication protocols, etc. (not shown) utilized by system 101. Storage 103 also includes various services, functions, and application programming interfaces (APIs) utilized by software applications that execute on system 101. In various embodiments, storage 103 includes the data, source code, libraries, and binary files utilized by software application 104; data utilized by diagnostic data component 200, such as a catalog of active memory spaces and associated PIDs; and/or data within requests to dump data. In one scenario, storage 103 includes an in-progress summary report (not shown) for a received request to perform a dump of data. Upon completion of a request to dump data, the summary log is removed from general storage within storage 103 and included in memory dump 107. In some scenarios, a copy of the summary report for a request to dump data is included in a historical log of dump request within log files 105.

Software application 104 includes one or more versions of a software application. In one embodiment of the present invention, software application 104 is comprised of one or more executable and/or interpretable files. Software application 104 may also include module, libraries, and binary files. In some embodiments of the present invention, software application 104 is an enterprise application that includes and/or interfaces with a plurality of other software applications. In an example, an e-commerce software application may utilize a web server, a domain name server (DNS), a database program, an e-mail program, a transaction-processing program, and a security program (e.g., a firewall, an authentication program, etc.). In various embodiments, during the execution of software application 104, software application 104 calls one or more APIs, services, or middleware programs installed on system 101.

Log files 105 include various logs associated with the operations system 101, one or more functions (not shown) monitoring system 101, and/or monitoring the execution of one or more applications hosted on system 101. Examples of files included within log files 105 include error logs, message logs, system logs, event logs, transaction logs, and process traces. In some embodiments of the present invention, one or more files within log files 105 are based on encoded data that is not readable by humans without parsing, conversion, and/or interpretation (e.g., post-processing). In addition, some data of log files 105 is structured as records in volatile memory. In various embodiments of the present invention, the data within log files 105 is stored to persistent storage within storage 103 as files. Records, data within one file of log files 105 can be related to other data within another file of log files 105. In an embodiment of the present invention, log files 105 include a dump summary log (not shown). The dump summary log includes a plurality of dump summary reports for historical requests to dump data to diagnose software applications and/or system 101. Diagnostic data component 200 can generate dump summary reports.

Memory space (MS) 106A through 106Z are areas of physical and/or virtualized memory of system 101 that are utilized by one or more services and processes, such as software application 104 and middleware programs 108. In some embodiments of the present invention, an instance of MS 106 is allocated from volatile memory of storage 103 in response to a service or program initiating. If a service is utilized by one or more users, other software applications, or other services, then the instance of MS 106 persists. However, some processes and programs can dynamically establish and revoke access to another process and temporarily link (e.g., share) memory spaces. Therefore, some shared memory (e.g., cross-memory) spaces may not be identified based on the timing (e.g., execution sequence) and interactions between processes. In some scenarios, an instance of MS 106 remains allocated but not accessed (e.g., linked). In other scenarios, if the process within the instance of MS 106 is terminated in response to revoking the link to the process, then the memory of the instance of MS 106 is released to the pool of memory of system 101 (e.g., a portion of storage 103).

Memory dump 107 is a snapshot of the data in memory at a point in time when a dump request initiates. Memory dump 107 may include user data, portions of the operating system, in process data, and code (e.g., compiled code, binary code, interpretable code, etc.) of an executing service, function, or program. In some embodiments of the present invention, memory dump 107 is encoded data that is not readable by humans without post processing. In addition, some of memory dump 107 is structured as records. In one embodiment of the present invention, memory dump 107 includes data associated with diagnosing the execution of software application 104. In another embodiment of the present invention, memory dump 107 includes data associated with diagnosing the execution and/or operations of one or more aspects of system 101, such as the operations of one or more programs of middleware programs 108, or one or more services utilized by users of system 101. In various embodiments of the present invention, memory dump 107 includes data associated with the hardware of system 101.

Middleware programs 108 include one or more programs, services, and/or protocols that connects software components and/or enterprise applications. Some middleware programs 108 utilize APIs to interface with software applications and/or components. Middleware programs 108 are included in the infrastructure, which facilitates creation of business applications; provides core services, such as concurrency, transactions, threading, and messaging; and a software communication architecture for service-oriented architecture applications. Middleware programs 108 enable communication and management of data within distributed software applications. Middleware programs 108 may include Web servers, application servers, content management systems, and a customer information control system (CICS®). Other middleware services are associated with clustering, security, logging, and monitoring.

System management functions 109 includes a plurality of services, functions, tasks, and programs utilized to monitor, administer, and utilize system 101. System management functions 109 includes services, functions, tasks, and programs that manage software execution (e.g., workloads), access log files, control resource allocations, trace executing processes, assist configuring servers, managing access and security policies, etc. System management functions 109 also includes services, functions, tasks, and programs for cataloging memory spaces, identifying cross-memory relationships, and performing dumps of memory spaces. In some embodiments of the present invention, an administrator of system 101 utilizes various windows associated with administrative interface 102 to access one or more services, functions, tasks, or programs of system management functions 109. In various embodiments of the present invention, a service, a function, a task, or a program of system management functions 109 generates another window, such as a dashboard within a portion of administrative interface 102.

In one or more embodiments of the present invention, the diagnostic data component 200 is a part of a processor circuit of the system 101. For example, the diagnostic data component 200 is a co-processor, or another subcircuit that is part of the processor circuit. The diagnostic data component 200 can include one or more computer executable instructions. Alternatively, the diagnostic data component 200, in one or more embodiments of the present invention, is a program that executes using the processor circuit of the system 101. The diagnostic data component 200 determines memory spaces related to a request to obtain data by utilizing a dump function, service, or program. In an embodiment of the present invention, diagnostic data component 200 identifies memory spaces allocated within a computing system by ASIDs. Diagnostic data component 200 can determine shared memory spaces and corresponding ASIDs (e.g., references) based on cross-memory relationships and/or by relationship among programs, services, and middleware executing within a computing system. Diagnostic data component 200 can initiate dumps of the determined memory spaces to obtain user-level data, system-level data, or a combination thereof. In one embodiment of the present invention, diagnostic data component 200 is utilized to obtain data to diagnose issues (e.g., non-fatal behaviors and abnormality) that occur during the execution of a software application. In another embodiment, diagnostic data component 200 is utilized to obtain data to diagnose issues and degradations of performance that occur during the operations of a computing system.

In some embodiments of the present invention, diagnostic data component 200 aggregates and filters the determined ASIDs of memory spaces associated with a received request to dump data. In addition, diagnostic data component 200 can generate a summary report of the processes (e.g., PIDs), ASIDs of address spaces, and data from various log files that are included in the memory dump associated with a received request to dump data.

In one embodiment of the present invention, system 101 communicates through network 120 to device 130. In some embodiments of the present invention, system 101 communicates with one or more other computing systems and/or computing resources (not shown), such as a web server, an e-mail server, a storage area network (SAN), etc. via network 120. Network 120 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 120 can be any combination of connections and protocols that will support communications between system 101 and device 130, in accordance with embodiments of the present invention. In various embodiments of the present invention, network 120 operates locally via wired, wireless, or optical connections and can be any combination of connections and protocols (e.g., personal area network (PAN), near field communication (NFC), laser, infrared, ultrasonic, etc.).

Device 130 includes User Interface (UI) 132 and storage 133. Storage 133 includes various programs and data (not shown) and memory dump 137. Examples of programs and data that device 130 may include are: an operating system, a web browser, an integrated development environment, one or more versions of software application 104 (e.g., source code, compiled code, etc.), a communication program, a data decompression program, and certificates and security information to access system 101. Memory dump 137 is representative of an instance of memory dump 107 that is transferred to device 130 for off-line analysis and debug of software application 104. In one or more embodiments of the present invention, the memory dump 137 can be transferred for offline consumption. In other embodiments, the memory dump 137 can be interactively viewed over the network connection 120 using the compute resources of system 101.

In one embodiment of the present invention, UI 132 may be a graphical user interface (GUI) or a web user interface (WUI), and UI 132 can display text, documents, forms, web browser windows, user options, application interfaces, and instructions for operation, and include the information, such as graphic, text, and sound that a program presents to a user. UI 132 enables a user (e.g., a software developer) of device 130 to communicate with system 101 via network 120. UI 132 can initiate the execution of an instance of software application 104 and in response view the results of user interactions with software application 104, such as submitting a request to check inventory and receiving the results of the inventory check. In addition, a user of device 130 can use UI 132 to communicate, with an administrator of system 101, a request to obtain a dump of data.

In some embodiments of the present invention, a user of device 130 can interact with UI 132 via a singular device, such as a touch screen (e.g., display) that performs both input to a GUI/WUI, and as an output device (e.g., a display) presenting a plurality of icons associated with apps and/or images depicting one or more executing software applications. In other embodiments of the present invention, a software program (e.g., a web browser) can generate UI 132 operating within the GUI environment of device 130. UI 132 accepts input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, UI 132 may receive input in response to a user of device 130 utilizing natural language, such as written words or spoken words, that device 130 identifies as information and/or commands.

Figure 2:
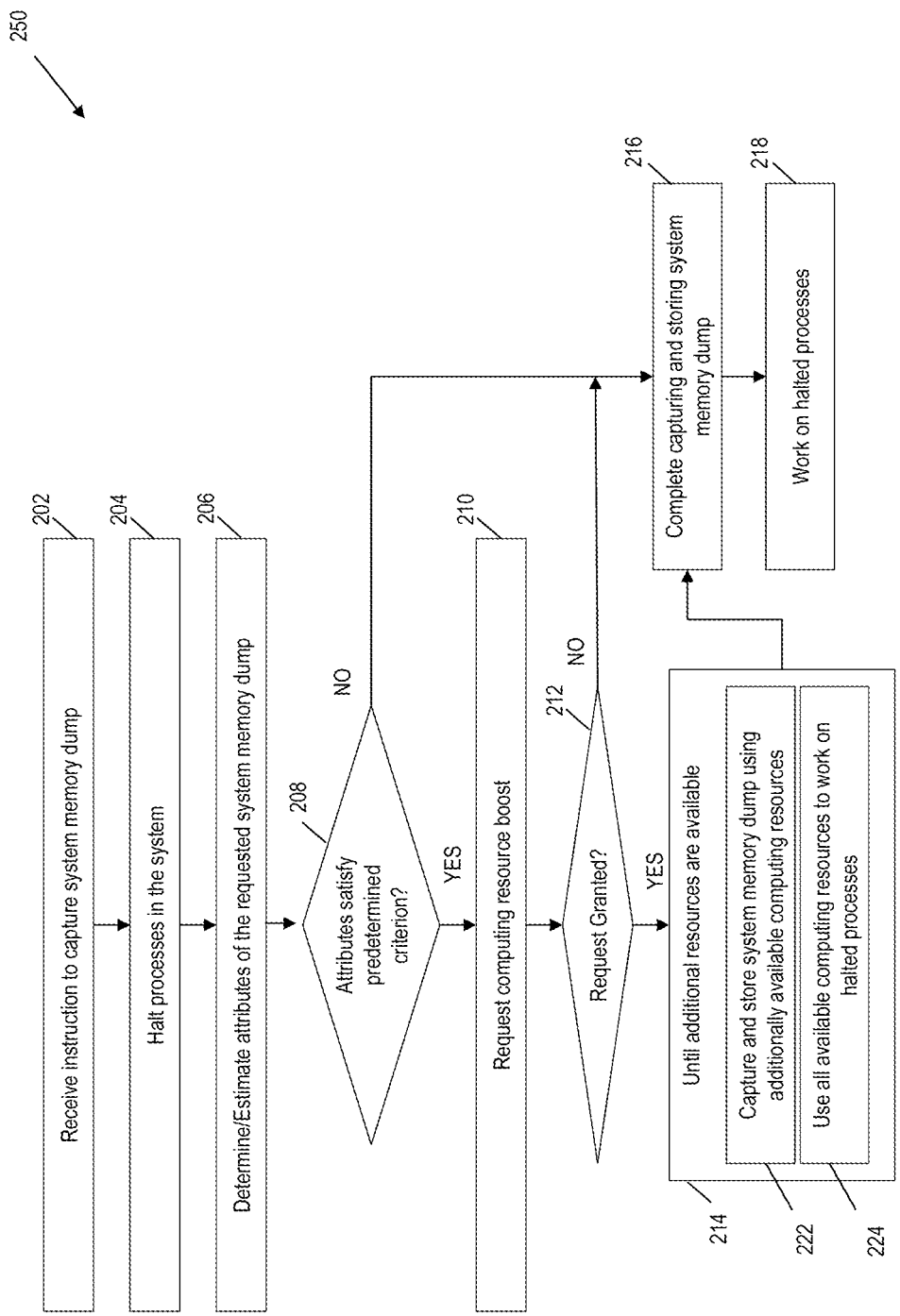
FIG. 2 depicts a flowchart of a method for capturing a system memory dump according to one or more embodiments of the present invention.

FIG. 2 depicts a flowchart of a method 250 for capturing a system memory dump using computational boost according to one or more embodiments of the present invention. The method can be executed by the diagnostic data component 200 in one or more embodiments of the present invention. The method 250 includes receiving an instruction to capture a system memory dump 107 associated with a computer process (or application 104) being executed by the system 101, at block 202.

The instruction can be received in response to an error during the execution of the computer process. In one or more embodiments of the present invention, the instruction is received automatically in response to the system 101 detecting the error (fatal/non-fatal). Alternatively, or in addition, the instruction is provided manually.

In one or more embodiments of the present invention, the other computer processes being executed by the system 101 are halted, at block 204. It should be noted that critical processes that are deemed required for the system 101 to function, such as operating system libraries, are not halted; rather, computer processes that are executed by (directly/indirectly) by one or more users may be those that are halted. Halting the processes can include setting one or more tasks and/or address spaces as non-dispatchable.

The diagnostic data component 200 further estimates or determines one or more attributes associated with the system memory dump 107 that is being requested, at block 206. For example, the diagnostic data component 200 estimates a size of the system memory dump 107. As noted earlier, the system memory dump 107 can encompass several address spaces depending on the memory usage of the application 104 and its associated libraries and APIs. The diagnostic data component 200 can estimate the data to be captured based on the memory spaces that are allocated to the application 104 and its associated libraries, APIs, and other executable components. In one or more embodiments, the sizes of the address spaces/memory locations that are allocated for such executable components are all added to estimate the system memory dump size. As noted herein, larger the dump size, more the time to capture, and write (i.e., record) the dump data, adversely impacting system operations during this time.

The diagnostic data component 200 can estimate the size of the system memory dump based on what address space(s) are being included and what type of storage is being requested. The diagnostic data component 200 can determine or estimate other attributes such as a criticality of the address spaces that are to be captured in the system memory dump 107. A specific address space, i.e., range of memory addresses, can be identified (i.e., specified) as critical address space, for example, based on the type of data that is designated to be stored in that address space. Alternatively, or in addition, the address space can be configured to be critical because its association with a particular process. The particular process may be deemed to be a critical process because of its use in the operation of the system 101. The diagnostic data component 200 can determine other attributes associated with the system memory dump 107 and/or the data that is to be captured in the system memory dump 107.

At block 208, the diagnostic data component 200, determined whether the attributes of the system memory dump 107 satisfy one or more predetermined criteria. If the criteria (on) are not met, capturing the system memory dump 107 continues as is, i.e., as typically performed in existing systems, at block 216. The specified criteria can include whether an estimated size of the system memory dump is greater than (or equal to) a predetermined threshold. The predetermined threshold can be configured, for example, using a command such as follows: CHNGDUMP SET, SDUMP, RPBMINSZ=xxxxxG|T. It is understood that any other syntax/semantics can be used for a command to configure the predetermined threshold.

Another example of the specified criteria can include what address space(s) the system memory dump 107 is capturing. If the system memory dump 107 is being directed to capture one of the critical address spaces, the criterion may be satisfied.

Alternatively, if the criteria(on) is met, the diagnostic data component 200 requests a computing resource boost from the one or more processing units of system 101, at block 210. In one or more embodiments of the present invention, requesting the computing resource boost can include checking, by the diagnostic data component 200, whether the one or more processing units of system 101 are equipped with the capability of providing a resource boost, and/or if such a capability of the processing units is enabled for access. For example, the capability to provide such a resource boost can be configured by a user via a system command and can be limited for use only for certain versions/partitions in the system 101.

If the system recovery boost capability is not available, the present capturing of the system memory dump 107 is followed, at block 216. If the system recovery boost capability is available, the diagnostic data component 200 sends a request for additional computing resources to the one or more processing units of the system 101, at block 210. The request for additional computing resources may not be granted depending on the state of the system 101, at block 212. For example, recovery process boost, in one or more embodiments of the present invention, is capped at 30 mins in a 24-hour timeframe. Hence, a request for boost may not be granted if the capability is disabled, or if boost time is not available (i.e., allotted system recovery boost time has been used for the specified duration.) Alternatively, the number of boost requests may be capped at a predetermined threshold in some embodiments of the present invention. in yet other embodiments of the present invention the number of boost requests within a predetermined timeframe is capped, for example, 10 requests per hour, or any other such limit.

If the request for additional computing resources is granted, at block 212, the one or more processing units provide additional processing power to be used for a finite, predetermined, configurable number of minutes. The additional processing power, for example, can boost the speed of the one or more processing units of system 101. In one or more embodiments of the present invention, the additional processing power can include one or more additional processing cores being activated for use. Other enhancements to the performance parameters of the one or more processing units can be provided in response to the request.

At block 214, during the predetermined duration for which the additional computing resources that are made available in response to the request being granted are used. The additional computing resources are used to capture system memory dump 107, at block 222. With the added speed, processing power, etc., the system memory dump 107 is captured faster, i.e., in shorter time. Further, if the system memory dump 107 is completely captured in the finite duration with the additional computing resources, at block 224, the additional computing resources are deployed to perform post-dump operations, such as restarting the halted process (from block 204). It should be noted that the additional computing resources are used in conjunction with the existing computing resources that were being used for the system memory dump capture and the post-dump operations.

Once the predetermined finite duration with the additional computing resources is completed, if system memory dump capture has not yet completed, the capturing is completed, at block 216. (FIG. 2 shows dotted arrows from block 214 to show conditionality.) Alternatively, or in addition, once the system memory dump 107 is captured, the halted computer processes are restarted, at block 218. Restarting halted processes can include setting one or more tasks and/or address spaces as dispatchable.

It should be noted that the operations depicted by blocks 216 and 218 in FIG. 2, are performed regardless of whether the request for system recovery process boost is granted or not. The block 216 includes any/all of the operations that have to be completed to capture the memory dump 107, which are performed by existing techniques. Further, the block 219 includes any/all of the post-dump operations that are to be performed after capturing the memory dump is completed. One of these post-dump operations include marking work dispatchable. In the case the system recovery process boost is granted, and after the finite duration of the system recovery boost ends (and "normal" processing resumes), the operations from either the data capture (216), or post-dump capture (218), continue using the pre-boost compute resources only.

One or more embodiments of the present invention address the technical challenge of long durations to capture system memory dumps that can render a computing system (101) slower. Embodiments of the present invention provide improvements that include intelligently applying a computing resource boost by requesting the additional resources when system-critical processes are requesting the system memory dump. This reduces impact of FFDC on mission critical workloads as extra processing power reduces the dump capture time.

Further, the diagnostic data component can use additional computing resources to operate on halted system operations and all tasks operations in the dumping address spaces while capturing the system memory dump (which is known as intentional stall). In other words, if the request to capture the system memory dump meets predefined criterion and the recovery process boost is requested and granted then the extra processing power will be used by additional data capture processes that are deployed in the dumping address spaces reducing the overall system memory dump capture times.

Applying the additional computing resource for system critical processes allows for work to recover post-dump from transactional build up due to the intentional stall that occurred while diagnostic data was being captured.

Implementing one or more embodiments of the present invention requires substantially little preparation work from a user. The use of the additional computing resources can be disabled anytime dynamically. Further, even if the recovery process boost is not granted, the operation of the system is not harmed, rather the system continues to operate as designed without the grant and operates in an improved state with the grant of the request.

Embodiments of the present invention accordingly provide improvements to computing technology and further provide practical application to a technical challenge in computing technology, particularly computing systems that have a large number of (millions+) of processes functioning concurrently. In response to a failure/error during operation of any process in the computing system, a system dump is captured. As described herein, generating such a system dump is resource-intensive and time-consuming, and has adverse performance impacts on other processes that are operating on the computing system. Embodiments of the present invention facilitate improvements to the computing technology that is used to capture a system dump, and in turn improving computing technology. Embodiments of the present invention described herein facilitate an improvement to dumping services by using processor architecture features, such as those on IBM® Z15™ processor. For example, the processor architecture features (e.g., recovery process boost on Z15™) facilitate requesting additional processing power during a system dump capture if the dump request meets certain criteria (at least one critical address space being captured, large dump, etc.). If the boost request is granted, the additional computing resources are used resulting in a shorter dump capture time. The computing system is further able to clear any backlog of work caused by the system dump data gathering. Embodiments of the present invention accordingly reduce the impact of FFDC on the computing system and restore system operations faster. Embodiments of the present invention, accordingly, improve computing technology, and provide a practical application to restore system operations after an error/failure by reducing the time required for the system dump.

It is to be understood that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
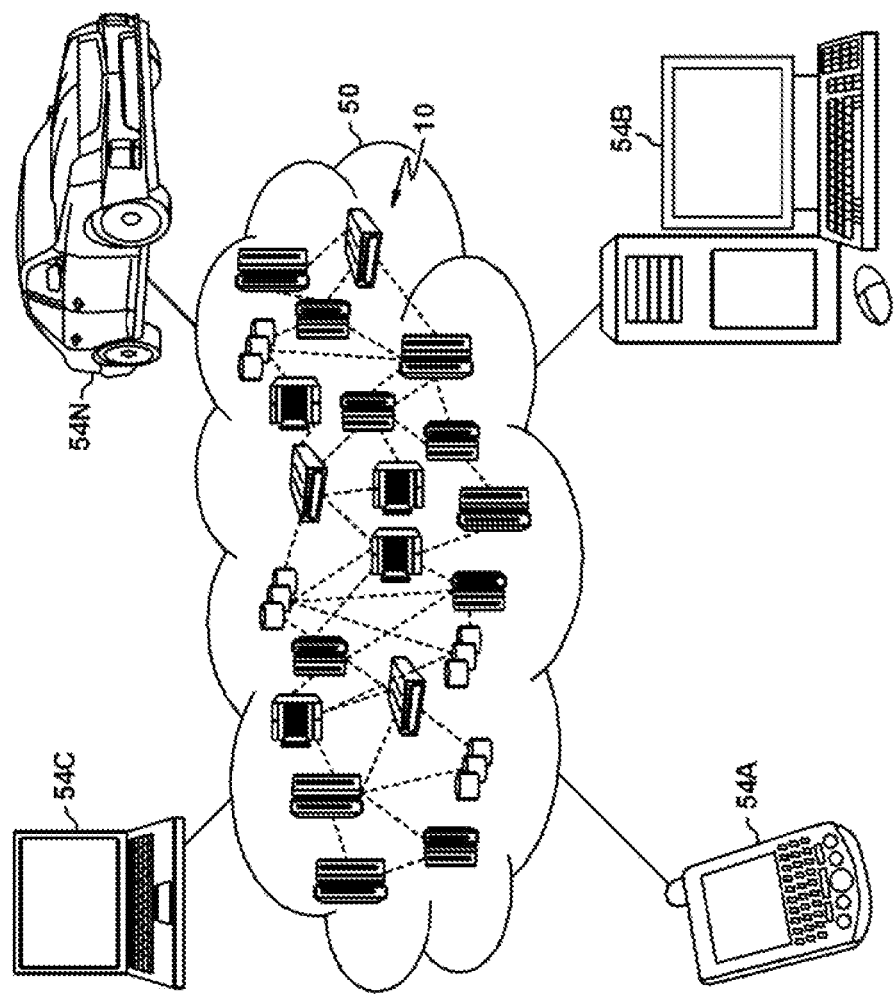
FIG. 3 depicts a cloud computing environment according to one or more embodiments of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computing system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
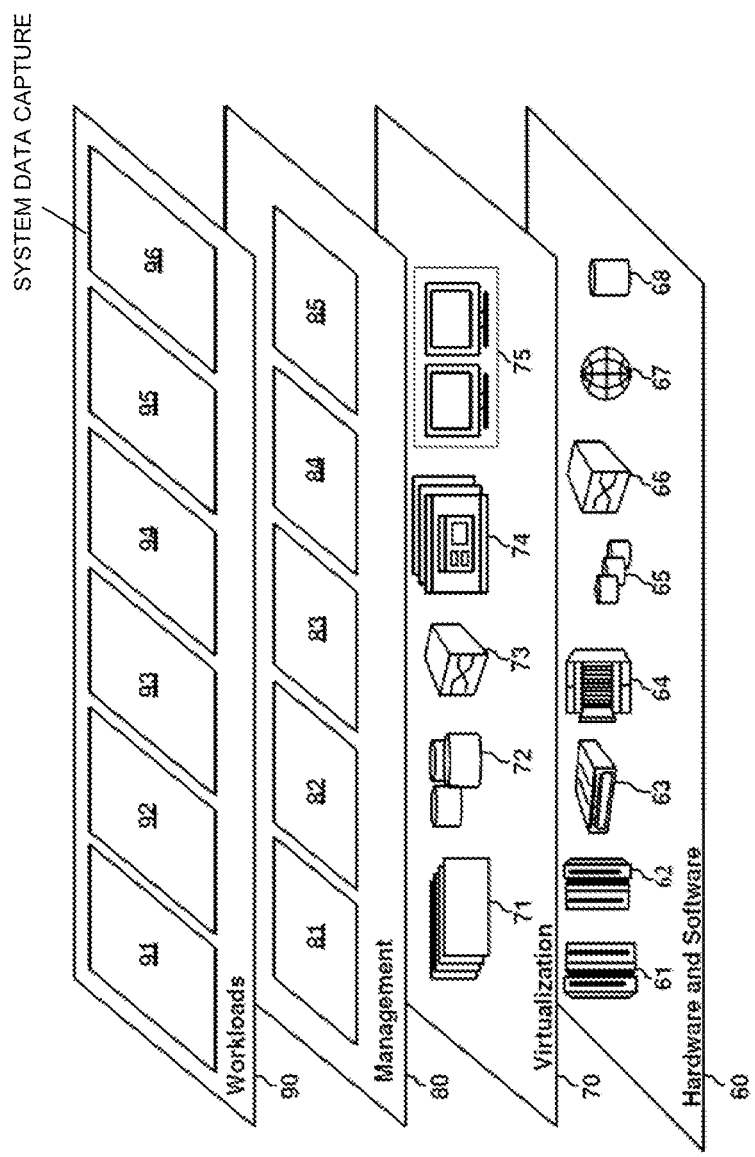
FIG. 4 depicts abstraction model layers according to one or more embodiments of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system memory dump capture 96.

Figure 5:
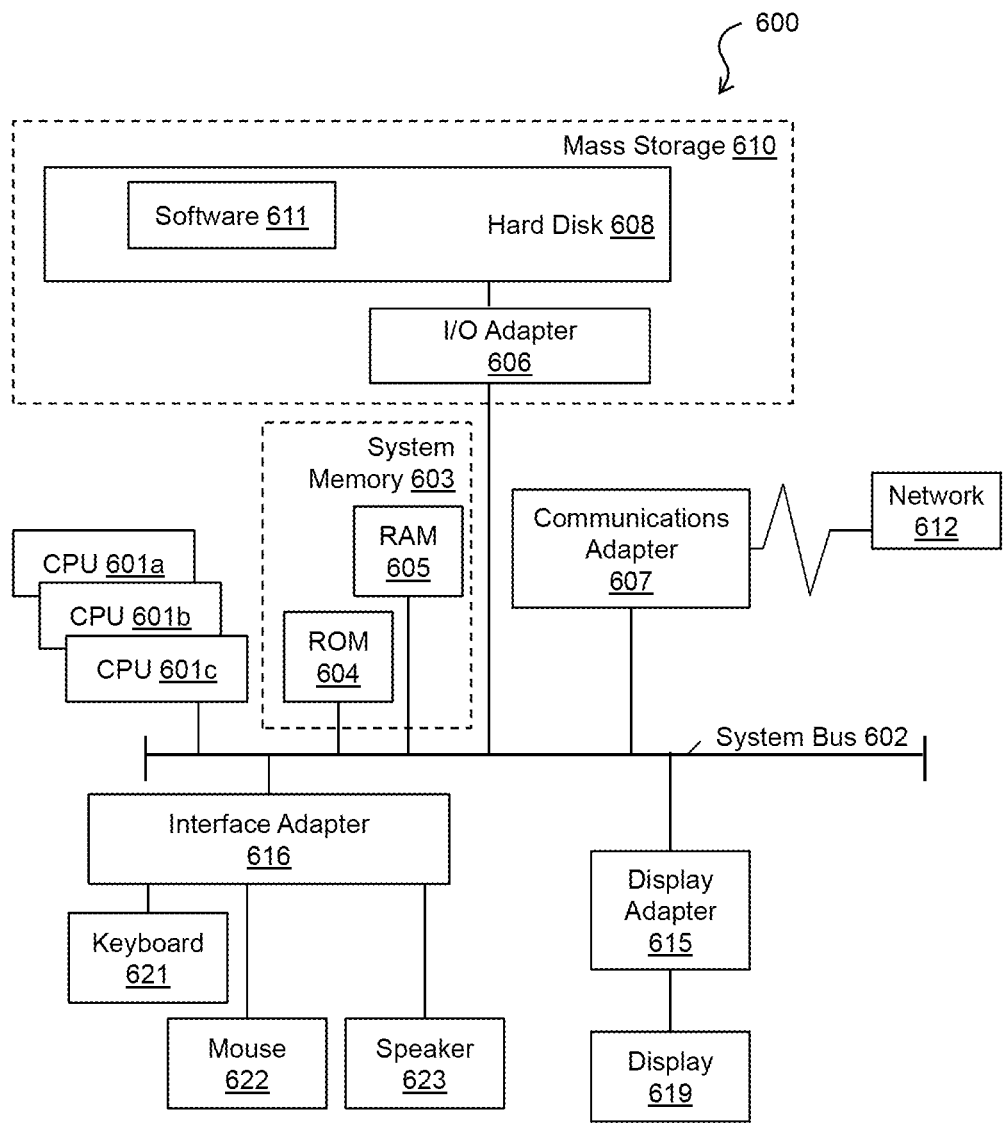
FIG. 5 depicts a digital computer in accordance with an embodiment.

Turning now to FIG. 5, a computing system 600 is generally shown in accordance with an embodiment. The computing system 600 can be used to implement the system 101, the device 130, or any other components in one or more embodiments of the present invention. The computer can also be used to implement the machine learning system 10. The computing system 600 can be an electronic, computer framework comprising and/or employing any number and combination of computing devices and networks utilizing various communication technologies, as described herein. The computing system 600 can be easily scalable, extensible, and modular, with the ability to change to different services or reconfigure some features independently of others. The computing system 600 may be, for example, a server, desktop computer, laptop computer, tablet computer, or smartphone. In some examples, computing system 600 may be a cloud computing node. Computing system 600 may be described in the general context of computing system executable instructions, such as program modules, being executed by a computing system. Generally, program modules may include routines, programs, objects, components, logic, data structures, and so on that perform particular tasks or implement particular abstract data types. Computing system 600 may be practiced in distributed cloud computing environments where tasks are performed by remote processing devices that are linked through a communications network. In a distributed cloud computing environment, program modules may be located in both local and remote computing system storage media including memory storage devices.

As shown in FIG. 5, the computing system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601 can include the diagnostic data component 200 in one or more embodiments of the present invention. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computing system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computing system 600 comprises an input/output (I/O) adapter 606 and a communications adapter 607 coupled to the system bus 602. The I/O adapter 606 may be a small computing system interface (SCSI) adapter that communicates with a hard disk 608 and/or any other similar component. The I/O adapter 606 and the hard disk 608 are collectively referred to herein as a mass storage 610.

Software 611 for execution on the computing system 600 may be stored in the mass storage 610. The mass storage 610 is an example of a tangible storage medium readable by the processors 601, where the software 611 is stored as instructions for execution by the processors 601 to cause the computing system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computing system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 5.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computing system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computing system interface, among others. The network 612 may be a cellular network, a radio network, a wide area network (WAN), a local area network (LAN), or the Internet, among others. An external computing device may connect to the computing system 600 through the network 612. In some examples, an external computing device may be an external webserver or a cloud computing node.

It is to be understood that the block diagram of FIG. 5 is not intended to indicate that the computing system 600 is to include all of the components shown in FIG. 5. Rather, the computing system 600 can include any appropriate fewer or additional components not illustrated in FIG. 5 (e.g., additional memory components, embedded controllers, modules, additional network interfaces, etc.). Further, the embodiments described herein with respect to computing system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method for capturing system memory dumps, the computer-implemented method comprising:
- receiving, by a diagnostic data component, an instruction to capture a system memory dump associated with a first computer process being executed by a computing system comprising one or more processing units, the system memory dump comprising data from a first memory space associated with the first computer process;
- determine a second computer process that is associated with the first computer process, and update the system memory dump to comprise data from a second memory space of the second computer process;
- in response to determining that the system memory dump satisfies a predetermined criterion, sending, by the diagnostic data component, a request for a computing resource boost from the computing system; and
- in response to the request for the computing resource boost being granted, using, by the diagnostic data component, additional computing resources from the one or more processing units to store the data from the first memory space and the second memory space in the system memory dump,
- wherein the request for the computing resource boost is granted based on a cap placed on availability of the additional computing resources for capturing the system memory dump, and
- wherein the cap comprises at least one of a duration for which the additional computing resources are made available, a duration for which the additional computing resources are made available within a particular time period, a number of requests for the computing resource boost, and a number of requests for the computing resource boost within a particular time period.

2. The computer-implemented method of claim 1, wherein the additional computing resources are granted to the diagnostic data component for a predetermined duration.

3. The computer-implemented method of claim 1, wherein the diagnostic data component further uses the additional computing resources to complete post dump operations comprising executing a backlogged computer process that was halted because of the capture of the system memory dump.

4. The computer-implemented method of claim 1, wherein the predetermined criterion comprises an estimate of a size of the system memory dump being greater than a predetermined threshold.

5. The computer-implemented method of claim 1, wherein the predetermined criterion comprises the system memory dump being directed to a particular predetermined memory space.

6. A computing system comprising:
- a memory;
- one or more processing units; and
- a diagnostic data component that is coupled with the memory and the one or more processing units, the diagnostic data component configured to perform a method for capturing a system memory dump, the method comprising:
  - receiving an instruction to capture the system memory dump associated with a first computer process being executed by the one or more processing units, the system memory dump comprising data from a first memory space associated with the first computer process;
  - determine a second computer process that is associated with the first computer process, and update the system memory dump to comprise data from a second memory space of the second computer process;
  - in response to determining that the system memory dump satisfies a predetermined criterion, sending a request for a computing resource boost from the one or more processing units; and
  - in response to the request for the computing resource boost being granted, using additional computing resources from the one or more processing units to store the data from the first memory space and the second memory space in the system memory dump,
  - wherein the request for the computing resource boost is granted based on a cap placed on availability of the additional computing resources for capturing the system memory dump, and
    - wherein the cap comprises at least one of a duration for which the additional computing resources are made available, a duration for which the additional computing resources are made available within a particular time period, a number of requests for the computing resource boost, and a number of requests for the computing resource boost within a particular time period.

7. The computing system of claim 6, wherein the additional computing resources are granted to the diagnostic data component for a predetermined duration.

8. The computing system of claim 6, wherein the diagnostic data component further uses the additional computing resources to complete post dump operations comprising executing a backlogged computer process that was halted because of the capture of the system memory dump.

9. The computing system of claim 6, wherein the predetermined criterion comprises an estimate of a size of the system memory dump being greater than a predetermined threshold.

10. The computing system of claim 6, wherein the predetermined criterion comprises the system memory dump being directed to capture a particular predetermined memory space.

11. A computer program product comprising a memory device having computer-executable instructions stored thereon, the computer-executable instructions when executed by one or more processing units cause the one or more processing units to perform a method for capturing a system memory dump, the method comprising:
- receiving an instruction to capture the system memory dump associated with a first computer process being executed by the one or more processing units, the system memory dump comprising data from a first memory space associated with the first computer process;
- determine a second computer process that is associated with the first computer process, and update the system memory dump to comprise data from a second memory space of the second computer process;
- in response to determining that the system memory dump satisfies a predetermined criterion, sending a request for a computing resource boost from the one or more processing units; and
- in response to the request for the computing resource boost being granted, using additional computing resources from the one or more processing units to store the data from the first memory space and the second memory space in the system memory dump, wherein the request for the computing resource boost is granted based on a cap placed on availability of the additional computing resources for capturing the system memory dump, and wherein the cap comprises at least one of a duration for which the additional computing resources are made available, a duration for which the additional computing resources are made available within a particular time period, a number of requests for the computing resource boost, and a number of requests for the computing resource boost within a particular time period.

12. The computer program product of claim 11, wherein the additional computing resources are granted for a predetermined duration.

13. The computer program product of claim 11, wherein the additional computing resources are used to complete post dump operations comprising executing a backlogged computer process that was halted because of the capture of the system memory dump.

14. The computer program product of claim 11, wherein the predetermined criterion comprises an estimate of a size of the system memory dump being greater than a predetermined threshold.

15. The computer program product of claim 11, wherein the predetermined criterion comprises the system memory dump being directed to at least one predetermined memory space.

16. The computer-implemented method of claim 1, wherein the additional computing resources comprises at least one of an increased speed of one or more processing units capturing the system memory dump, and an increased number of processing units to capture the system memory dump.

17. The computing system of claim 6, wherein the additional computing resources comprises at least one of an increased speed of one or more processing units capturing the system memory dump, and an increased number of processing units to capture the system memory dump.

18. The computer program product of claim 11, wherein the additional computing resources comprises at least one of an increased speed of one or more processing units capturing the system memory dump, and an increased number of processing units to capture the system memory dump.

\* \* \* \* \*